US010681912B2

(12) United States Patent
Ohashi et al.

(10) Patent No.: US 10,681,912 B2
(45) Date of Patent: *Jun. 16, 2020

(54) DISPERSION SOLUTION CONTAINING ANTIBACTERIAL ULTRAFINE METAL PARTICLES AND METHOD OF PRODUCING THE SAME

(71) Applicant: TOYO SEIKAN GROUP HOLDINGS, LTD., Tokyo (JP)

(72) Inventors: Kazuaki Ohashi, Yokohama (JP); Yasuhiro Kosaka, Yokohama (JP); Akiko Ogata, Yokohama (JP); Hiroshi Shimomura, Osaka (JP); Akira Ishiko, Osaka (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 343 days.

This patent is subject to a terminal disclaimer.

(21) Appl. No.: 15/032,511

(22) PCT Filed: Oct. 30, 2014

(86) PCT No.: PCT/JP2014/078922
§ 371 (c)(1),
(2) Date: Apr. 27, 2016

(87) PCT Pub. No.: WO2015/064700
PCT Pub. Date: May 7, 2015

(65) Prior Publication Data
US 2016/0255841 A1 Sep. 8, 2016

(30) Foreign Application Priority Data

Oct. 30, 2013 (JP) .................................. 2013-225940

(51) Int. Cl.
| | | |
|---|---|---|
| A01N 59/16 | (2006.01) | |
| A01N 25/04 | (2006.01) | |
| B22F 9/24 | (2006.01) | |
| A01N 59/20 | (2006.01) | |
| B22F 1/00 | (2006.01) | |

(52) U.S. Cl.
CPC ............ *A01N 59/16* (2013.01); *A01N 25/04* (2013.01); *A01N 59/20* (2013.01); *B22F 1/0022* (2013.01); *B22F 9/24* (2013.01)

(58) Field of Classification Search
None
See application file for complete search history.

(56) References Cited

U.S. PATENT DOCUMENTS

| | | | |
|---|---|---|---|
| 8,361,553 B2 | 1/2013 | Karandikar et al. | |
| 8,900,624 B2 | 12/2014 | Karandikar et al. | |
| 10,174,208 B2 * | 1/2019 | Ohashi | C08K 9/04 |
| 2005/0204865 A1 | 9/2005 | Hirai et al. | |
| 2007/0003603 A1 * | 1/2007 | Karandikar | A01N 59/16 424/443 |
| 2008/0138643 A1 | 6/2008 | Lee et al. | |
| 2013/0122321 A1 | 5/2013 | Karandikar et al. | |
| 2013/0316997 A1 | 11/2013 | Ohashi et al. | |
| 2015/0072066 A1 | 3/2015 | Karandikar et al. | |

FOREIGN PATENT DOCUMENTS

| | | |
|---|---|---|
| CN | 101138643 A | 3/2008 |
| EP | 2 248 797 A1 | 11/2010 |
| JP | 8-311373 A | 11/1996 |
| JP | 2008-508321 A | 3/2008 |
| JP | 2008-95195 A | 4/2008 |
| JP | 2009-209052 A | 9/2009 |
| JP | 2009-226400 A | 10/2009 |
| JP | 2010-248124 A | 11/2010 |
| JP | 5318272 B1 | 10/2013 |
| JP | 2013-241643 A | 12/2013 |
| WO | 2011/007650 A1 | 1/2011 |
| WO | 2012/111673 A1 | 8/2012 |

OTHER PUBLICATIONS

Munwar et al., International Journal of Recent Scientific Research, vol. 8, No. 8, pp. 19057-19060. (Year: 2017).*
Zhu et al., Chem, pp. 220-245. (Year: 2016).*
Lofstrom-Engdahl et al. Diluent effects in solvent extraction, Proceedings of the First ACSEPT International Workshop, Lisbon, Portugal, Mar. 31-Apr. 2, 2010 (Year: 2010).*
Burke, Solubility Parameters:Theory and Application, The Book and Paper Group Annual, vol. 3, pp. 1-35. (Year: 1984).*
Communication dated May 15, 2017 from the European Patent Office in counterpart application No. 14857740.6.
Communication dated Nov. 22, 2016, issued by the State Intellectual Property Office of the P.R.C. in corresponding Chinese Application No. 201480060033.3.
International Search Report of PCT/JP2014/078922, dated Jan. 27, 2015. [PCT/ISA/210] .

* cited by examiner

*Primary Examiner* — Abigail Vanhorn
(74) *Attorney, Agent, or Firm* — Sughrue Mion, PLLC

(57) ABSTRACT

A dispersion solution containing ultrafine metal particles, comprising a low-boiling solvent and, contained therein, ultrafine metal particles of any one of Ag, Cu or Zn having a fatty acid and a glyceride coordinated on the surfaces thereof. The dispersion solution contains, dispersed therein, ultrafine metal particles that have excellent antibacterial power at a high concentration without being aggregated. The dispersion solution maintains excellent dispersion property even after the passage of long periods of time and also exhibits very high degree of transparency even when it is mixed into a resin composition.

6 Claims, 1 Drawing Sheet

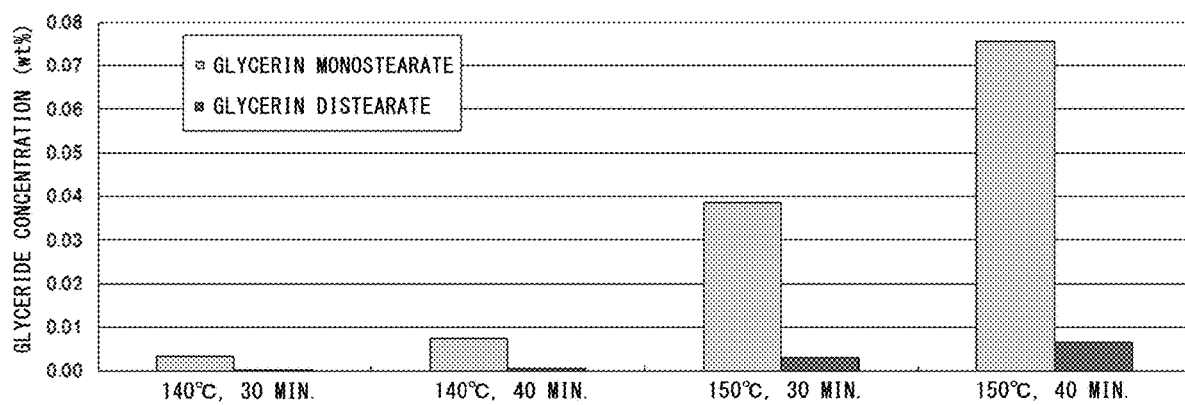

DISPERSION SOLUTION CONTAINING ANTIBACTERIAL ULTRAFINE METAL PARTICLES AND METHOD OF PRODUCING THE SAME

CROSS REFERENCE TO RELATED APPLICATIONS

This application is a National Stage of International Application No. PCT/JP2014/078922 filed Oct. 30, 2014, claiming priority based on Japanese Patent Application No. 2013-225940, filed Oct. 30, 2013, the contents of all of which are incorporated herein by reference in their entirety.

TECHNICAL FIELD

This invention relates to a dispersion solution containing ultrafine metal particles obtained by dispersing ultrafine metal particles in a low-boiling solvent and to a method of producing the same. More specifically, the invention relates to a dispersion solution having excellent antibacterial property and transparency obtained by dispersing ultrafine metal particles in a low-boiling solvent without permitting them to be aggregated or precipitated therein, and to a method of producing the same.

BACKGROUND ART

In recent years, it has been desired to impart antibacterial power not only to the products such as medical supplies and containers used under high-temperature and high-humidity conditions like in kitchen, bathroom, washroom, etc., where bacteria and molds tend to easily propagate but also to articles used in public places such as straps and the like, materials related to dwelling, such as wallpapers and building materials, filters such as of air conditioners, and various other products such as stationeries. Therefore, a variety of antibacterial compositions have been proposed to meet the demand.

The antibacterial compositions have been provided in a variety of forms such as a formed body obtained by containing an antibacterial agent in a thermoplastic resin or a thermosetting resin, a film obtained by containing an antibacterial material in a coating material, and a dispersion solution obtained by dispersing an antibacterial agent in a solvent.

For instance, a patent document 1 listed below is describing a composition that contains a solvent, silver nanoparticles and a stabilizer. It is, however, difficult to disperse the silver nanoparticles without permitting them to be aggregated and, besides, a stabilizer is necessary to prevent the aggregation. Moreover, the above composition is not still satisfactory from the standpoint of transparency and efficient use of silver. A composition described in a patent document 2 is not the one that is to be applied onto an article that has been formed in advance unlike that of the patent document 1. Namely, the composition of the patent document 2 is used in combination with a resin to impart antibacterial power to a resinous formed article itself, and offers advantage in regard to productivity and sustenance of the effect. The composition, however, is not still satisfactory in regard to attaining more antibacterial power than the conventional antibacterial power using expensive substances such as silver and the like in amounts less than the amounts used so far.

A patent document 3 listed below describes a photocurable composition for antibacterial coating comprising a photocurable acrylic resin that contains a silver salt, and a patent document 4 listed below proposes a resinous formed body such as a protector board for use with various display devices, the resinous formed body comprising a photocurable resin that contains an antibacterial agent and/or an anti-molding agent so as to produce antibacterial power.

In a resin composition obtained by blending a photocurable acrylic resin with a silver salt like the resin compositions of the patent documents 3 and 4, it is difficult to efficiently and homogeneously disperse the silver salt in the acrylic resin, and it is not possible to obtain a resin composition satisfying both the requirements of antibacterial power and economy. It has, therefore, been desired to contain ultrafine silver particles capable of exhibiting excellent antibacterial power in the resin composition without permitting them to be aggregated.

Under such circumstances, the present inventors have proposed a transparent dispersion solution containing ultrafine silver particles formed of fatty acid silver and saccharin and a method of producing the same (JP-A-2013-241643). According to this method, ultrafine silver particles having excellent antibacterial power can be dispersed, by a relatively simple operation, in a low-boiling solvent that can be preferably used for imparting antibacterial power to the resin compositions without permitting the ultrafine particles to be aggregated in the low-boiling solvent. Further, the method efficiently removes by-products that affect the transparency of the dispersion solution. The obtained solution contains ultrafine silver particles without aggregation thereof, and exhibits excellent antibacterial power as well as excellent transparency.

PRIOR ART DOCUMENTS

Patent Documents

Patent document 1: JP-T-2008-508321
Patent document 2: JP-A-2010-248124
Patent document 3: JP-A-8-311373
Patent document 4: WO2011/007650

OUTLINE OF THE INVENTION

Problems that the Invention is to Solve

It is, however, difficult to efficiently migrate the ultrafine silver particles prepared in a high-boiling solvent into a low-boiling solvent. Therefore, it has been desired to prepare a dispersion solution which contains ultrafine silver particles at a high concentration in good productivity. It has, however, been known that the ultrafine silver particles dispersed in the low-boiling solvent undergo the aggregation and precipitate after the passage of long periods of time.

It is, therefore, an object of the present invention to provide a dispersion solution in which ultrafine metal particles having excellent antibacterial power are dispersed at a high concentration without being aggregated, the dispersion solution maintaining excellent dispersion property even after the passage of long periods of time and also exhibiting very high degree of transparency even when it is mixed into a coating composition or a resin composition. The invention, further, provides a method of its production.

Means for Solving the Problems

According to the present invention, there is provided a dispersion solution containing ultrafine metal particles, comprising a low-boiling solvent and, contained therein, ultrafine metal particles of any one of Ag, Cu or Zn having a fatty acid and a glyceride coordinated on the surfaces thereof.

In the dispersion solution containing ultrafine metal particles of the invention, it is desired that the low-boiling solvent comprises ketones.

According to the present invention, further, there is provided a method of producing a dispersion solution containing ultrafine metal particles, including steps of:
preparing a glycerin as a high-boiling solvent,
adding a fatty acid metal salt of a metal of any one of Ag, Cu or Zn and saccharin to said high-boiling solvent,
heating and mixing them together to thereby prepare a high-boiling dispersion in which the ultrafine metal particles are dispersed, said ultrafine metal particles being a metal of any one of Ag, Cu or Zn and having a fatty acid and a glyceride coordinated the surfaces thereof,
mixing said high-boiling dispersion in which the ultrafine metal particles are dispersed and a low-boiling solvent together, and
isolating said high-boiling solvent and said low-boiling solvent into two phases so that the ultrafine metal particles are extracted from said high-boiling solvent into said low-boiling solvent (hereinafter often referred to as "a first production method").

In the first method of producing a dispersion solution containing ultrafine metal particles of the invention, it is desired that the heating and mixing are conducted while the temperature of the high-boiling solvent is in a range of 120 to 230° C. after the fatty acid metal salt and the saccharin have been added thereto.

According to the present invention, further, there is provided a method of producing a dispersion solution containing ultrafine metal particles, including steps of:
preparing a glycerin as a high-boiling solvent,
adding a fatty acid metal salt of a metal of any one of Ag, Cu or Zn and saccharin to said high-boiling solvent,
heating and mixing them together to thereby prepare a high-boiling dispersion in which the ultrafine metal particles are dispersed,
mixing said high-boiling dispersion in which the ultrafine metal particles are dispersed and a glyceride-containing low-boiling solvent together, and
isolating said high-boiling solvent and said low-boiling solvent into two phases so that the ultrafine metal particles migrate from said high-boiling solvent into said low-boiling solvent (hereinafter often referred to as "a second production method").

In the second method of producing a dispersion solution containing ultrafine metal particles of the invention, it is desired that the glyceride-containing low-boiling solvent contains the glyceride in an amount of 0.02 to 5% by weight. In the present invention, it is desired that:
1. The low-boiling solvent comprises ketones and, specifically, methylisobutyl ketone or methyl ethyl ketone; and
2. A difference is not more than 3 between a solubility parameter (SP value) of the glyceride and a solubility parameter (SP value) of the methylisobutyl ketone or the methyl ethyl ketone which is the low-boiling solvent.

Effects of the Invention

In the dispersion solution containing ultrafine metal particles of the invention, the fatty acid and the glyceride are coordinated on the surfaces of the ultrafine metal particles, the glyceride having very excellent compatibility with the low-boiling solvent. As will be described later, therefore, the ultrafine metal particles are extracted in an accelerated manner from the high-boiling solvent into the low-boiling solvent, are contained in the low-boiling solvent at a high concentration, and are dispersed very favorably in the low-boiling solvent. Moreover, the ultrafine metal particles are dispersed in the low-boiling solvent maintaining further improved stability, i.e., the ultrafine metal particles are maintained dispersed in the low-boiling solvent and are prevented from precipitating.

Moreover, since the ultrafine metal particles are dispersed without being aggregated, the dispersion solution maintains excellent transparency and efficiently expresses antibacterial power. Here, the antibacterial power is a property that suppresses the propagation or proliferation of bacteria.

In the dispersion solution containing ultrafine metal particles of the invention, further, the ultrafine metal particles are dispersed in the low-boiling solvent. Therefore, the dispersion solution can be favorably used as a diluent for coating compositions and resin compositions, and excellent antibacterial power can be imparted to the films and the resinous formed bodies.

In the first method of producing a dispersion solution containing ultrafine metal particles of the invention, glycerin is used as a high-boiling solvent, and they are heated and mixed together to form ultrafine metal particles having the fatty acid and the glyceride that are coordinated on the surfaces of thereof. The ultrafine metal particles have excellent affinity to the low-boiling solvent and can, therefore, be efficiently extracted from the high-boiling solvent into the low-boiling solvent through a simple operation; i.e., the ultrafine metal particles can be made present in the low-boiling solvent at a high concentration.

In the second production method of the invention, too, the glyceride is contained in the low-boiling solvent, in advance, making it possible to coordinate the fatty acid and the glyceride on the surfaces of the ultrafine metal particles much more than by the first production method. In isolating the solvents into two phases, therefore, the fine metal particles are extracted from the high-boiling solvent into the low-boiling solvent in an accelerated manner, and a dispersion solution is prepared containing ultrafine metal particles at a further increased concentration.

As described above, further, the ultrafine metal particles that have migrated into the low-boiling solvent stay dispersed therein maintaining excellent stability without being aggregated for extended periods of time. It is, further possible to efficiently remove by-products that affect the transparency of the dispersion solution, which is also advantageous from the standpoint of productivity. Moreover, the dispersion medium is the low-boiling solvent which favorably serves as a diluent for the resin compositions such as painting materials to impart antibacterial power thereto.

The above effects of the invention will also become obvious from the results of Examples described later.

That is, in the solution in which ultrafine metal particles are dispersed of the invention, incase the fatty acid and the glyceride are coordinated on the ultrafine metal particles, the ultrafine metal particles remain homogeneously dispersed without aggregated. Namely, the ultrafine metal particles do not precipitate even after the passage of a predetermined period of time and remain dispersed maintaining excellent stability (Examples 1 and 2).

From the results of Example 3, further, in case the glyceride is added to the low-boiling solvent in advance, the ultrafine metal particles migrate in further increased amounts into the low-boiling solvent, showing that use of the glyceride is effective.

BRIEF DESCRIPTION OF THE DRAWING

FIG. 1 is a diagram showing the concentrations of the glyceride in the dispersion solutions obtained in Examples 1 and 2 and in Comparative Examples 1 and 2.

MODES FOR CARRYING OUT THE INVENTION

Antibacterial Components

It is important that the dispersion solution containing ultrafine metal particles of the invention uses, as antibacterial components for forming ultrafine metal particles, a fatty acid metal salt of a metal of any of Au, Cu or Zn as metal species and saccharine.

It is desired that the blending ratio of the fatty acid metal salt and the saccharin is, in terms of weight ratio, in a range of 1:0.01 to 1:5 and, specifically, 1:0.1 to 1:1. If the blending ratio lies outside the above range, it is probable that the components increase that do not serve for forming the ultrafine metal particles, causing not only disadvantage in economy but also a decrease in the transparency.

In the invention, as the fatty acid that forms the fatty acid metal salt used in combination with the saccharin, there can be exemplified myristic acid, stearic acid, oleic acid, palmitic acid, n-decanoic acid, paratoluic acid, succinic acid, malonic acid, tartaric acid, malic acid, glutaric acid, adipic acid and acetic acid. Among them, the stearic acid can be favorably used.

The metal component may be any one of Ag (silver), Cu (copper) or Zn (zinc), but silver is particularly preferred.

As the most desirable fatty acid metal salt, there can be exemplified the silver stearate.

The fatty acid metal salt can be a blend of a plurality of kinds of fatty acid metal salts such as of different metal species.

(High-Boiling Solvent)

In the invention, it is important to use a glycerin as the high-boiling solvent in a first step that will be described later.

As described above, the invention uses a glycerin as the high-boiling solvent in which the fatty acid metal salt and the saccharin are to be contained whereby the fatty acid and the glycerin undergo the esterification reaction to form glyceride that has affinity to the fatty acid coordinated on the ultrafine metal particles. Therefore, the glyceride is coordinated round the fatty acid or being mixed with the fatty acid.

In the invention as will be described later, in mixing the low-boiling solvent to the glycerin that is blended with the fatty acid metal salt and the saccharin, there is, further, mixed a high-boiling solvent that has stronger affinity to the fatty acid than the glycerin such as ethylene glycol or diethylene glycol but that is not compatible with the low-boiling solvent. This makes it possible to improve the efficiency for extracting the ultrafine metal particles from the glycerin into the low-boiling solvent.

(Low-Boiling Solvent)

In the dispersion solution containing ultrafine metal particles of the invention, the low-boiling solvent used as a dispersion medium for containing ultrafine metal particles is a solvent that has a boiling point lower than a boiling point of the high-boiling solvent that will be described later and that can be isolated from the high-boiling solvent to form two phases. It is, further, important that a difference is small between an SP value of the low-boiling solvent and an SP value of the fatty acid or the glyceride coordinated on the surfaces of the ultrafine metal particles. This makes it possible to extract the ultrafine metal particles from the high-boiling solvent and to remove the high-boiling solvent together with the by-products and residues.

It is desired that the low-boiling solvent has a boiling point in a range of, preferably, 40 to 120° C. from the standpoint of productivity and handling of the resin composition layer that constitutes the transparent material.

As the low-boiling solvent, though not limited thereto only, there can be exemplified ketones such as methylbutyl ketone, methyl ethyl ketone, etc.

Among the low-boiling solvents according to the invention, furthermore, it is desired to select a low-boiling solvent that is highly compatible with the fatty acid or the glyceride so that the ultrafine metal particles can be efficiently extracted from the high-boiling solvent at the time of isolating the solvents into two phases. Namely, it is desired to so select the low-boiling solvent that a difference (absolute value) is not more than 3 between an SP value (solubility parameter) of the fatty acid or the glyceride coordinated on the surfaces of the particles and an SP value of the low-boiling solvent.

Concretely speaking, if a silver stearate is used as the fatty acid metal salt, there can be preferably used a methylbutyl ketone.

(Method of Producing a Dispersion Solution Containing Ultrafine Metal Particles)

The dispersion solution containing ultrafine metal particles of the invention can be prepared by the following two production methods.

(1) First Production Method.

(1-1) First Step.

In a first step in the first production method of the present invention, ultrafine metal particles having a fatty acid or a glyceride coordinated on the surfaces thereof are formed in the glycerin that is the high-boiling solvent. There is no limitation on the conditions so far as the ultrafine metal particles can be formed. Preferably, however, the fatty acid metal salt and the saccharin are added to the glycerin. After the addition, the high-boiling solvent is heated at a temperature in a range of 120 to 230° C. and, specifically, 140 to 170° C. Though dependent upon the temperature of heating, the heating and mixing are continued for 10 to 120 minutes and, specifically, 30 to 80 minutes to thereby form the ultrafine metal particles in the glycerin, the ultrafine metal particles having the fatty acid and the glyceride coordinated on the surfaces thereof. That is, upon being heated in the above temperature range, the fatty acid metal salt is decomposed and reduced into the fatty acid and the metal that forms ultrafine metal particles that have the fatty acid coordinated on the surfaces thereof. The fatty acid and the glycerin undergo the esterification reaction to form the glyceride. Like the fatty acid, the glyceride, too, is coordinated on the surfaces of the ultrafine metal particles which are dispersed in the glycerin.

Here, it is desired that the fatty acid metal salt which is the antibacterial component is contained in an amount of 0.1 to 2% by weight. If the amount of the fatty acid metal salt is less than the above range, the antibacterial power cannot be imparted to the dispersion solution to a sufficient degree. If the amount of the fatty acid metal salt is larger than the above range, on the other hand, the antibacterial effect can be reinforced bring about, however, disadvantage in economy and formability.

(1-2) Second Step.

Next, the low-boiling solvent is added to the ultrafine metal particle-containing glycerin followed by stirring and mixing to prepare a mixed solution thereof. Here, as an assistant for extraction, other high-boiling solvents such as ethylene glycol and the like may also be added together with the low-boiling solvent.

The amount of the low-boiling solvent to be added cannot be exclusively determined but is, desirably, in a range of 10 to 200 parts by weight per 100 parts by weight of the high-boiling solvent that is used.

Other high-boiling solvents such as ethylene glycol and the like are added together with the low-boiling solvent, desirably, in amounts in a range of 50 to 100 parts by weight per 100 parts by weight of the low-boiling solvent.

(1-3) Third Step.

The mixed solution of the high-boiling solvent and the low-boiling solvent is left to stand still at a temperature of 0 to 40° C. for not less than 60 minutes to isolate the high-boiling solvent and the low-boiling solvent into phases and, thereafter, the high-boiling solvent is removed.

After the mixed solution is isolated into phases, the ultrafine metal particles having the fatty acid and the glyceride coordinated on the surfaces thereof are extracted from the high-boiling solvent into the low-boiling solvent. Here, the unreacted fatty acid metal salt and the aggregate that has turned into the metal itself due to over-reduction are left in the high-boiling solvent. By removing the high-boiling solvent, therefore, there is obtained a dispersion solution comprising the low-boiling solvent in which the ultrafine metal particles only are dispersed.

The high-boiling solvent can be removed by a customary method such as simple distillation, reduced pressure distillation, precision distillation, membrane distillation, extraction or membrane isolation.

(2) Second Production Method.

(2-1) First Step.

The principal object of the first step in the second production method of the invention is to form the ultrafine metal particles having the fatty acid coordinated thereon in the glycerin that is the high-boiling solvent. There is no limitation on the conditions so far as the ultrafine metal particles can be formed. Desirably, however, the fatty acid metal salt and the saccharin are added to the glycerin, and the high-boiling solvent thereof after the addition, is heated at a temperature in a range of 120 to 230° C. and, specifically, 140 to 170° C. followed by mixing for 10 to 120 minutes and, specifically, 30 to 80 minutes.

In the second production method, too, like in the first production method, it is desired that the ultrafine metal particles are formed having the fatty acid and the glyceride coordinated on the surfaces thereof. This makes it possible to increase the content of the ultrafine metal particles in the final dispersion solution.

(2-2) Second Step.

Next, a mixed solution is prepared by adding a glyceride-containing low-boiling solvent to the ultrafine metal particle-containing glycerin. Here, in the invention as described above, the other high-boiling solvents such as ethylene glycol and the like may be added thereto together with the low-boiling solvent.

By mixing the ultrafine metal particle-containing glycerin into the glyceride-containing low-boiling solvent, the fatty acid and the glyceride are coordinated on the surfaces of the ultrafine metal particles, and there are formed the same ultrafine metal particles as those formed by the first production method and at a high concentration.

The content of the glyceride in the low-boiling solvent varies depending on the content of the antibacterial component that is used, and cannot be exclusively determined but is, preferably, in a range of 0.02 to 5% by weight per 100 parts by weight of the low-boiling solvent.

Further, the amount of the glyceride-containing low-boiling solvent may vary depending on the content of the glyceride and the content of the antibacterial component, and cannot be exclusively specified but is, desirably, in a range of 10 to 200 parts by weight per 100 parts by weight of the high-boiling solvent.

It is, further, desired that the amounts of the other high-boiling solvents such as ethylene glycol and the like added together with the low-boiling solvent, are in a range of 50 to 100 parts by weight per 100 parts by weight of the low-boiling solvent.

(2-3) Third Step.

Like in the first production method, the mixed solution of the high-boiling solvent and the low-boiling solvent is allowed to stand still at a temperature of 0 to 40° C. for not less than 60 minutes, whereby the high-boiling solvent and the low-boiling solvent are isolated into phases and, thereafter, the high-boiling solvent is removed.

(Dispersion Solution Containing the Ultrafine Metal Particles)

As described earlier, the dispersion solution containing the ultrafine metal particles of the present invention comprises the low-boiling solvent such as methylisobutyl ketone or methyl ethyl ketone in which are dispersed particles having an average primary particle size of not more than 100 nm and, specifically, 10 to 50 nm and having an average secondary particle size of not more than 900 nm and, specifically, 200 nm to 700 nm. If mixed to the coating composition or the resin composition, therefore, the dispersion solution containing the ultrafine metal particles does not cause a decrease in the transparency of the composition itself. The average primary particle size referred to in the specification stands for an average size of the metal particles that are present without gap among the metal particles. The average secondary particle size stands for an average size of the metal particles that are in a packed state.

Further, since the ultrafine metal particles are homogeneously dispersed without being conspicuously aggregated, excellent antibacterial power can be expressed.

In the dispersion solution containing the ultrafine metal particles used in the invention, further, the ultrafine metal particles present in the dispersion solution have the fatty acid coordinated on the surfaces thereof and, further, have the glyceride coordinated around the fatty acid or on the surfaces thereof exhibiting, therefore, very excellent dispersion stability and without almost precipitating even after the passage of long periods of time. Therefore, the ultrafine metal particles disperse well and homogeneously even in the resin composition that constitutes a transparent material. In the dispersion solution, further, the ultrafine metal particles have the glyceride coordinated around the fatty acid or on the surfaces thereof. In the resin composition layer, therefore, the resin comes little into direct contact with the surfaces of the ultrafine metal particles. This effectively suppresses the decomposition of the resin, suppresses a decrease in the molecular weight of the resin, and effectively prevents the formability or the workability from being impaired.

The dispersion solution containing ultrafine metal particles of the invention can be favorably used as a diluent for the coating compositions and the resin compositions. This makes it possible to impart antibacterial power to the films comprising the coating composition or to the resinous formed bodies comprising the resin composition without impairing the transparency of the coating composition or the resin composition.

As the coating composition, there can be exemplified thermosetting resins such as phenol resin, epoxy resin, urethane resin, melamine resin, urea resin, alkyd resin, unsaturated polyester resin and silicone resin, as well as photocurable acrylic resins as base resins.

As the resin composition, further, there can be exemplified, in addition to the above thermosetting resins, olefin resins such as low-, intermediate- and high-density polyethylenes, linear low-density polyethylene, linear very low-density polyethylene, isotactic polypropylene, syndiotactic polypropylene, propylene-ethylene copolymer, polybutene-1, ethylene-butene-1 copolymer, propylene-butene-1 copolymer and ethylene-propylene-butene-1 copolymer; polyester resins such as polyethylene terephthalate, polybutylene terephthalate and polyethylene naphthalate; polyamide resins such as nylon 6, nylon 6,6, and nylon 6,10; and thermoplastic resins such as polycarbonate resin, etc.

The dispersion solution containing ultrafine metal particles of the invention has excellent transparency, and can be favorably used as a diluent for acrylic resins that require particularly high degree of transparency and, among them, for the compositions comprising the photocurable acrylic resins.

EXAMPLES

Example 1

3.85 Grams of a silver stearate and 0.385 g of a saccharin were added to 700 g of a glycerin, and the mixture thereof was heated at 150° C. for 30 minutes. After the glycerin was cooled down to 60° C., 700 g of a methylisobutyl ketone and 525 g of an ethylene glycol were added thereto and stirred. After left to stand still for about one hour, a layer of the methylisobutyl ketone was picked up and a dispersion solution containing silver particles was obtained.

Example 2

A dispersion solution was prepared in the same manner as in Example 1 but changing the heating time to 40 minutes.

Example 3

A dispersion solution was prepared in the same manner as in Example 1 but adding 0.55% by weight of a glycerin monostearate to the methylisobutyl ketone solution in advance.

Comparative Example 1

A dispersion solution was prepared in the same manner as in Example 1 but changing the heating temperature to 140° C.

Comparative Example 2

A dispersion solution was prepared in the same manner as in Example 1 but changing the heating temperature to 140° C. and the heating time to 40 minutes.

(Measuring the Glyceride)

The dispersion solutions prepared in Examples 1 and 2 and in Comparative Examples 1 and 2 were measured for their glyceride concentrations. After the methylisobutyl ketone dispersion solutions were concentrated, dried and solidified, a trimethylsilylation reagent was added hereto to measure the amounts of the glyceride by using a gas chromatograph (QP2010, manufactured by Shimazu Mfg. Co.). The measured results were as shown in FIG. 1.

(Measuring the Amounts of Silver)

The dispersion solutions prepared in Examples 1 and 3 were measured for their amounts of silver. Ten mL of pure water and 2 mL of nitric acid were added to 0.2 g of an MIBK solution, and the mixture was heated. Thereafter, in a graduated cylinder, pure water was added to the mixture thereof such that the amount thereof was 25 mL. By using an emission spectrometer (iCAP6500 manufactured by Thermo Scientific Co.), the resulting solution was measured for the amount of silver contained therein. From the results of Table 3, it was learned when the glyceride was added to the MIBK in Example 3, silver particles migrated in larger amounts into the low-boiling solvent than when the glyceride was not added in Example 1.

(Precipitation of Particles)

The dispersion solutions prepared above were left to stand at room temperature. After one month has passed, the dispersion solutions were confirmed with the naked eye in regard to if the silver particles have precipitated. The results were as shown in Table 1.

(Measuring SP Values)

The SP value has the same meaning as the solubility parameter, and serves as a rough indication of mixing property between the liquids. If the cohesive energy is denoted by E and the molar volume by V, then the SP value $\delta$ is given by $\delta=(E/V)^{1/2}$. Table 2 shows SP values.

TABLE 1

| | Reaction temperature | Reaction time | Amount of ester by GC measurement (wt %) | | Precipitation Yes: X, No: ○ |
|---|---|---|---|---|---|
| | | | Glycerin monostearate | Glycerin distearate | |
| Example 1 | 150 | 30 | 0.0386 | 0.0031 | ○ |
| Example 2 | 150 | 40 | 0.0755 | 0.0067 | ○ |
| Comp. Ex. 1 | 140 | 30 | 0.0032 | 0.0001 | X |
| Comp. Ex. 2 | 140 | 40 | 0.0076 | 0.0005 | X |

TABLE 2

| | SP Value |
|---|---|
| Methylisobutyl ketone | 8.7 |
| Glycerin monostearate | 10.8 |
| Glycerin distearate | 9.5 |

TABLE 3

| | Reaction temperature | Reaction time | *1 | *2 |
|---|---|---|---|---|
| Example 1 | 150 | 30 | no | 0.028 |
| Example 3 | 150 | 30 | yes | 0.039 |

*1: Glycerin monostearate added to methylisobutyl ketone
*2: Amount of silver in methylisobutyl ketone (wt %)

As will be obvious from Table 1 above, if the glyceride is present, there is no precipitation. It is learned that when there is the precipitation, the amount of the glyceride is smaller than that of when there is no precipitation. From Table 2, further, it is learned that the detected glyceride and the low-boiling solvent or the methylisobutyl ketone have SP values close to each other and, therefore, that the silver particles on which the glyceride is coordinated do not precipitate.

INDUSTRIAL APPLICABILITY

Upon being used as a diluent for the coating compositions or the resin compositions, the dispersion solution containing ultrafine metal particles of the present invention works to impart excellent antibacterial power to the films and to the resinous molded particles without impairing their transparency.

Specifically, the dispersion solution containing ultrafine metal particles of the invention can be favorably used as a diluent for acrylic resins that are used as bar code materials being formed on the films for protecting the liquid crystal display devices and, therefore, works to efficiently impart antibacterial power to the films having excellent transparency for protecting the liquid crystal display devices.

The invention claimed is:

1. A dispersion containing ultrafine metal particles which have an average primary particle size of not more than 100 nm and an average secondary particle size of not more than 900 nm, the dispersion comprising:
    a solvent comprising methylisobutyl ketone and, contained therein,
    the ultrafine metal particles having a silver (Ag) stearate and a glyceride coordinated on the surfaces thereof.

2. A method of producing a dispersion containing Ag stearate ultrafine metal particles which have an average primary particle size of not more than 100 nm and an average secondary particle size of not more than 900 nm, including steps of: preparing a high-boiling solvent comprising glycerin, adding Ag stearate and saccharin to said high-boiling solvent, heating and mixing the high-boiling solvent, the Ag stearate and the saccharin together to thereby prepare a high-boiling dispersion in which the ultrafine metal particles are dispersed, said ultrafine metal particles having the Ag stearate and a glyceride coordinated on the surfaces thereof, mixing said high-boiling dispersion in which the ultrafine metal particles are dispersed and a low-boiling solvent comprising methylisobutyl ketone together, and isolating said high-boiling solvent and said low-boiling solvent into two phases so that the ultrafine metal particles are extracted from said high-boiling solvent into said low-boiling solvent.

3. The method of producing a dispersion containing ultrafine metal particles according to claim 2, wherein the heating and mixing are conducted at a temperature in a range of 120 to 230° C. after said Ag stearate and said saccharin have been added.

4. The method of producing a dispersion containing ultrafine metal particles according to claim 2, wherein a difference is not more than 3 between a solubility parameter (SP value) of said Ag stearate or said glyceride and a solubility parameter (SP value) of said low-boiling solvent.

5. A method of producing a dispersion containing Ag stearate ultrafine metal particles which have an average primary particle size of not more than 100 nm and an average secondary particle size of not more than 900 nm, including steps of: preparing a high-boiling solvent comprising glycerin, adding Ag stearate and saccharin to said high-boiling solvent, heating and mixing the high-boiling solvent, the Ag stearate and the saccharin together to thereby prepare a high-boiling dispersion in which the ultrafine metal particles are dispersed, mixing said high-boiling dispersion in which the ultrafine metal particles are dispersed and a glyceride-containing low-boiling solvent comprising methylisobutyl ketone together, and isolating said high-boiling solvent and said low-boiling solvent into two phases so that the ultrafine metal particles migrate from said high-boiling solvent into said low-boiling solvent.

6. The method of producing a dispersion containing ultrafine metal particles according to claim 5, wherein said glyceride-containing low-boiling solvent contains the glyceride in an amount of 0.02 to 5% by weight.

* * * * *